United States Patent [19]
Reichel

[11] Patent Number: 6,106,046
[45] Date of Patent: Aug. 22, 2000

[54] VEHICLE SEAT ARRANGEMENT

[75] Inventor: Anton Reichel, Ditzingen, Germany

[73] Assignee: Daimler-Benz AG, Germany

[21] Appl. No.: 09/022,443

[22] Filed: Feb. 12, 1998

[30]  Foreign Application Priority Data

Feb. 12, 1997  [DE]  Germany ............................ 197 05 281

[51] Int. Cl.[7] ...................................................... B60N 2/10
[52] U.S. Cl. .......................... 296/65.09; 296/37.2; 297/15
[58] Field of Search ................................ 296/37.2, 65.05, 296/65.09, 69, 3, 66; 297/15

[56]  References Cited

U.S. PATENT DOCUMENTS

| | | |
|---|---|---|
| 1,508,576 | 9/1924 | Remde . |
| 4,519,646 | 5/1985 | Leitermann et al. ............ 296/65.09 X |
| 5,195,795 | 3/1993 | Cannera et al. . |
| 5,269,581 | 12/1993 | Odagaki et al. ................. 296/65.09 X |
| 5,868,451 | 2/1999 | Uno et al. ......................... 296/65.09 X |
| 5,890,758 | 4/1999 | Pone et al. ........................ 296/65.09 X |

FOREIGN PATENT DOCUMENTS

| | | |
|---|---|---|
| 394482A | 1/1909 | France . |
| 2677601-A1 | 12/1992 | France ................. 296/65.09 |
| 2722456A | 1/1996 | France . |
| 491056 | 2/1930 | Germany . |
| 1944654U1 | 10/1964 | Germany . |
| 19518393A1 | 10/1995 | Germany . |
| 7326 | 3/1909 | United Kingdom ..................... 296/15 |

OTHER PUBLICATIONS

DE1944654, Aug. 18, 1966, Germany.
Preliminary Examination, French Patent Office, Apr. 23, 1999.

*Primary Examiner*—B. Dayoan
*Assistant Examiner*—Jason Morrow
*Attorney, Agent, or Firm*—Evenson, McKeown, Edwards & Lenahan, P.L.L.C.

[57]  ABSTRACT

A vehicle, especially a minivan, having at least one rear seat located behind the front seat as viewed in the direction of travel. The seat has a seat back that can be pivoted onto a seat part. A floor pan is located in front of the rear seat in the vehicle floor for accommodating lowering of the rear seat. A folding mechanism pivots the rear seat, folded together by folding the seat back onto the seat part, into the floor pan. To achieve a limited floor pan thickness while retaining a seat height of the seat part of the rear seat that is determined by seating comfort, the folding mechanism has two front and two rear supports, each of the supports being pivotable around a pivot axis aligned transversely to the lengthwise direction of the vehicle and secured to the seat part. The supports hold the rear seat in its operating position at a predetermined seat height above the vehicle floor. The two front supports are mounted so that their ends remote from the seat part can pivot around a pivot axis that is aligned transversely to the lengthwise direction of the vehicle and is defined below the vehicle floor, while the two rear seats are each mounted releasably in a supporting bearing accommodated in the vehicle floor.

26 Claims, 1 Drawing Sheet

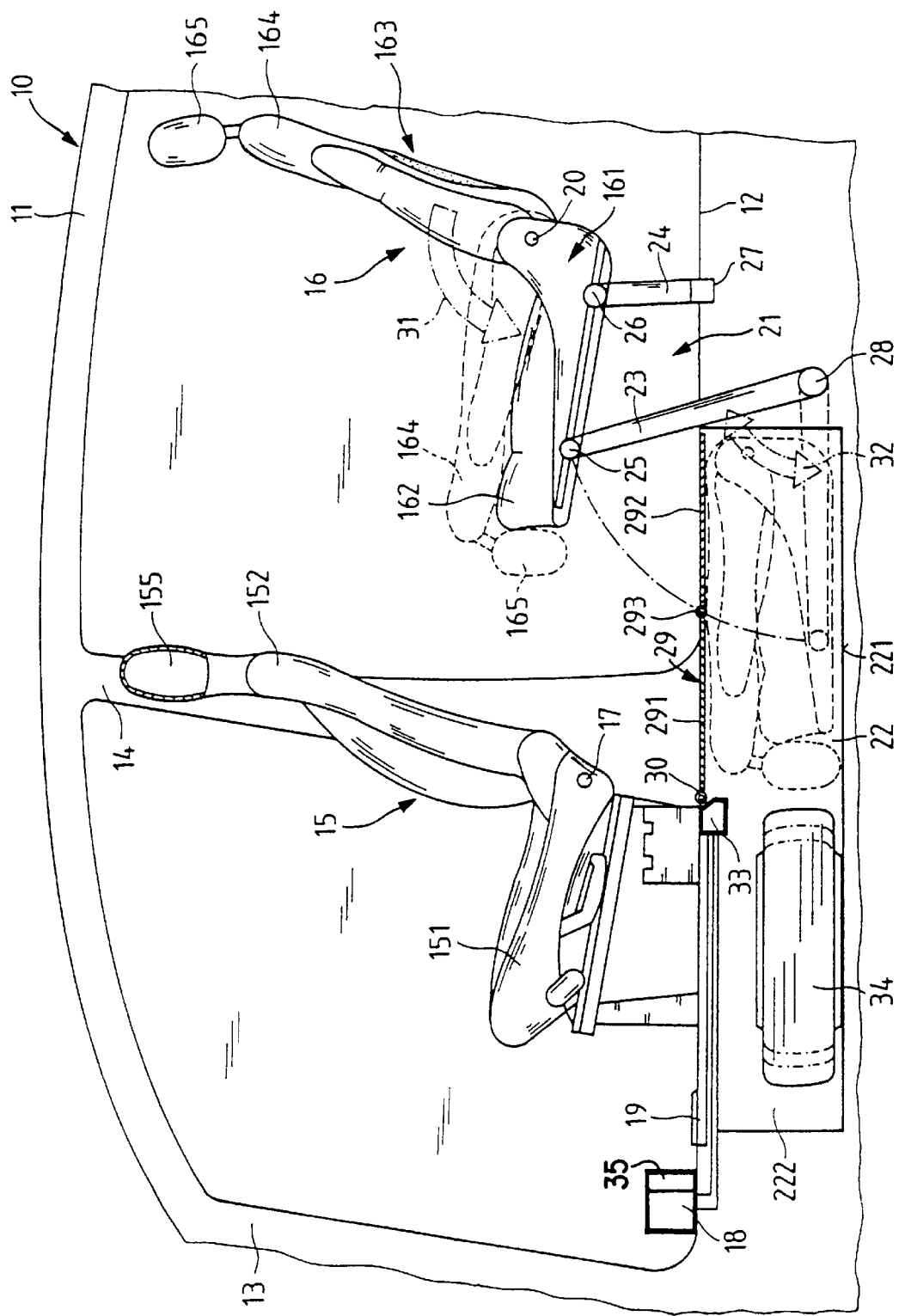

VEHICLE SEAT ARRANGEMENT

BACKGROUND AND SUMMARY OF THE INVENTION

This application claims the priority of German application 197 05 281.9-16 filed in Germany on Feb. 12, 1997.

The invention relates to a vehicle with at least one rear seat located behind a front seat as viewed in the direction of travel, said rear seat comprising a seat part mounted on the vehicle floor and a seat back mounted pivotably thereto, with a floor pan located in the vehicle floor in front of the rear seat to receive the rear seat when folded together by folding the seat back onto the seat part, with the edge of the floor pan being flush with the floor and with a folding mechanism to pivot the folded rear seat into the floor pan.

In a known vehicle, especially a tank, of this general design (DE 19 44 654 U1) each seat part of a plurality of vehicle seats located behind and next to one another is articulated directly at the edge of the floor pan at floor level and the depth of the floor pan is adapted for comfortable sitting on the seat part located in its use position, with the seated individual placing his/her feet on the floor pan. With the seat lowered into the floor pan, the seat back is folded down onto the seat cushion of the seat part and the underside of the seat part forms a plane smooth plate that is flush with the vehicle floor and seals off the floor pan so that a flat cargo area is available throughout the interior of the vehicle. If necessary, each seat can be unfolded again at any point in time at the expense of the cargo volume. The folding mechanism for lowering the vehicle seat into the floor pan and raising the vehicle seat out of the floor pan again is constituted by a hinge that is located at the lower front edge of the seat part next to the edge of the floor pan, said hinge being secured to the vehicle floor. This known vehicle has the disadvantage that because of the floor pan depth being adapted to the seat height, the dimension of the vehicle floor in the travel direction of the vehicle is considerable and the height of the interior that is available for cargo when the vehicle seats are lowered is significantly reduced.

Minivans of current design have a relatively small cargo volume behind the last row of seats when all the seats are in place. To enlarge this volume, the vehicle seats can be disconnected and removed. It is disadvantageous in this regard that it is necessary to disassemble, i.e. disconnect the individual vehicle seats from their anchored positions in the vehicle floor and to store the vehicle seats that have been removed, outside the vehicle in fixed locations that must be found again when an additional passenger seat is required. As a result, the vehicle can be adapted only by expending considerable time to adapt to changing needs as regards passenger capacity and cargo volume.

A goal of the invention is to design the folding mechanism in a vehicle of the species recited at the outset in such fashion that the depth of the floor pan need be dimensioned only to reflect the packet thickness of the rear seat when folded down and need not depend upon the seat height of the rear seat that is required for good seating comfort, so that the advantage of the permanently available rear seat that is offered in the known vehicle, said seat being stored in the floor to increase the cargo area and being capable of being raised again at any time if a seat is required, can also be provided in minivans.

This goal is achieved in a vehicle of the type referred to above by providing an arrangement wherein said folding mechanism has two front and two rear supports, each support being designed to pivot around a pivot axis defined by the seat part and aligned in a lengthwise direction of the vehicle, said supports securing the rear seat in its operating position at a preset seat height above the vehicle floor, wherein the two front supports are mounted so that their ends remote from the seat part can pivot around a pivot axis aligned transversely to the lengthwise direction of the vehicle and defined below the vehicle floor, and wherein the two rear supports are each secured in a bearing accommodated in the vehicle floor, the bearings for the two rear supports being designed as support bearings in which ends of the supports are releasably received.

The vehicle according to the invention has the advantage that the depth of the floor pan to receive a rear seat need only be adapted exclusively to the relatively limited packet thickness of the folded rear seat, said thickness being determined essentially by the thickness of the seat cushion and seat back cushion on the seat part and seat back, and the seat height to be provided for seating comfort is defined by the folding mechanism. A much greater cargo area is then available if needed and the seats continue to be permanently associated with the vehicle so that they can be made available at any time by simply unfolding them. The total of four supports for the folding mechanism can be dimensioned so that either the floor pan or a load-resistant floor panel that covers the floor pan and lies flush with the vehicle floor forms the foot support area for the seated passengers. In the latter case, which is preferred, the floor pan volume available below the floor plate can be used as additional cargo space.

According to one advantageous embodiment of the invention, the floor pan opening can be covered by a load-resistant floor panel that lies flush with the vehicle floor, said pan preferably being secured pivotably to the vehicle floor by a pivot axis that runs along its transverse edge located furthest from the rear seat. For reasons of improved handling with limited space available between the front and rear seats, according to another embodiment of the invention the floor panel is divided parallel to its pivot axis and the two panel parts can be folded onto one another along a pivot axis that is parallel to the main pivot axis.

If the front seat is equipped with a seat back that can be adjusted by a motor and/or if it can be moved by a motor in conventional fashion in the lengthwise direction of the vehicle, according to one advantageous embodiment of the invention the control device that is provided for controlling the drive motors to adjust the seat is provided with an additional control function such that when the floor pan is opened by raising the floor panel, a shifting movement of the front seat is performed in a direction that increases the distance from the rear seat and/or causes an erecting motion of the seat back into a given position that permits the rear seat to pivot into the floor pan and is not impeded by the seat back of the front seat.

According to one advantageous embodiment of the invention, the floor pan extends to a point below the at least one front seat, and also accommodates the spare wheel. The spare wheel is introduced through the floor opening that is exposed when the floor panel is raised, and is pushed beneath the expanded area of the pan below the front seat so that space remains available for pivoting the rear seat downward.

Other objects, advantages and novel features of the present invention will become apparent from the following detailed description of the invention when considered in conjunction with the accompanying drawings.

BRIEF DESCRIPTION OF THE DRAWINGS

The single drawing FIGURE shows, sectionwise and schematically, a side view of a minivan with one front seat and one rear seat, constructed according to a preferred embodiment of the invention.

DETAILED DESCRIPTION OF THE DRAWINGS

The minivan shown in the drawing in a side view, schematically and sectionwise, as an embodiment of a vehicle, especially an automobile, has a body 10 of which a portion of vehicle roof 11 and vehicle floor 12 can be seen, said roof and floor being connected with one another by body side parts called pillars, of which so-called A pillar 13 and so-called B pillar 14 can be seen. The vehicle is equipped with seats, of which a front seat 15 and a rear seat 16 are shown here in a side view. In all, two front seats 15 are provided for the driver and passenger and at least two rows of seats are located behind, each having two or more rear seats 16 arranged side by side. Front seat 15 is adjustable lengthwise in known fashion on rails 19 fastened to vehicle floor 12 in order to be able to adapt its position relative to the steering wheel to the individual needs of various drivers and consists in known fashion of a seat part 151 secured to be displaceable lengthwise on rails 19, a seat back 152 pivotably mounted on seat part 151, and a headrest 155 mounted adjustably on seat back 152. Displacement of seat part 151 on rails 19 and pivoting of seat back 152 around pivot axis 17 defined on seat part 151 is performed by means of electric motors 300 that serve as control motors, said motors being controlled by a control unit 18 as a function of commands given by the passenger.

Each of rear seats 16, like front seat 15, has a seat part 161 with a seat cushion 162, a seat back 163 with a back cushion 164, said seat back 163 being pivotable around a pivot axis 20 defined on seat part 161, and a head rest 165 adjustably mounted on seat back 163. Seat part 161 is anchored by a folding mechanism 21 to vehicle floor 12, with folding mechanism 21 allowing folded rear seat 16 to be lowered into a pan 22 located in vehicle floor 12 in front of rear seat 16. For this purpose, folding mechanism 21 has two forward and two rear supports 23 and 24 respectively, with one front support 23 and one rear support 24 being located on each side of seat part 161. The two front supports 23 are pivotable around a pivot axis 25 that is defined transversely to the lengthwise direction of the vehicle on seat part 161 in its forward area, while the two rear supports 24 are mounted to pivot around a pivot axis 26 provided for the purpose, said axis 26 being parallel to axis 25 and likewise located on seat part 161, but in its rear area. The two ends of rear supports 24 that are remote from the seat part are each received in a support bearing 27 recessed in vehicle floor 12, while the ends of the two front supports 23 that are remote from the seat part are mounted to pivot around a pivot axis 28 located at the height of floor pan 21 below vehicle floor 12.

In the operating position of rear seat 16 shown in the drawing, the two rear supports 24 are anchored in support bearings 27 and thus locked in stable fashion to prevent their pivoting. The opening of pan 22 can be closed by a load-resistant floor panel 29 that fits flush with vehicle floor 12 and thus ensures the ability of the area in front of rear seat 16 to accept the weight of persons walking on it. Floor panel 29 is secured pivotably to vehicle floor 12 so that it can pivot around a pivot axis 30 that runs along its transverse edge that is remote from the rear seat. Floor panel 29 is divided into two panel parts, and its two panel parts 291 and 292 can be unfolded onto one another around a folding axis 293 that runs parallel to pivot axis 30, so that despite the limited space available between front and rear seats 15 and 16, floor plate 29 can easily be pivoted upward to expose the pan opening completely.

The dimensions of pan 22 are set so that at least folded rear seat 16 can be accommodated in pan 22. For this purpose, the seat back is pivoted forward through approximately 90° so that seat back cushion 164 rests on seat cushion 162. Headrest 165 is folded down so that its head cushion is located in front of the front side of seat cushion 162. Depending on the dimensions of this seat packet, shown in the drawing by dashed lines and dot-dashed lines, the dimensions of seat pan 22 are maintained, especially with the depth of pan 22 being adjusted to the thickness of the seat packet, said packet being composed essentially of the total of the thicknesses of seat cushion 162 and seat back cushion 164. In one advantageous embodiment, floor pan 22 can also be expanded in the lengthwise direction of the vehicle so that it extends up to a point below front seat 15. The additional cargo space 222 thus created serves to receive a spare wheel 34, which is introduced into the floor pan opening when floor panel 29 is raised and can then be pushed into enclosed spare wheel area 222 below front seat 15.

To lower rear seat 16, the two panel parts 291, 292 of floor panel 29 are folded onto one another and pivoted upward around pivot axis 30. Then seat back 163 is folded down onto seat part 161, as indicated by arrow 31 in the drawing. Seat back 163 then resting on seat cushion 162 as well as headrest 165, which is then located at a point in front of the front part of seat part 161, are represented by the dashed lines in the drawing. Then the two rear supports 24 are unlocked in their support bearings 27 and the seat packet represented by the dashed lines in the drawing is pivoted into floor pan 22 by means of forward supports 23, as indicated by arrow 32 in the drawing. Folded rear seat 16 located in floor pan 22 is represented by the dot-dashed lines in the drawing. Then floor panel 29 is swung down again over the floor pan opening by unfolding the two panel parts 291, 292 and lies flush with vehicle floor 12. The space that has now been made available by rear seat 16 can be used as additional cargo space with a flat cargo area.

In order to prevent both the folding of rear seat 16 as well as the lowering of rear seat 16 into floor pan 22 being impeded by seat back 153 of front seat 15, which may occur if front seat 15 is in a position in which it is pushed back considerably or if its seat back 152 is tilted considerably backward, an additional control function is integrated into control device 18, said function moving front seat 15 by means of the control motors into a position when floor panel 29 is raised such that rear seat 16 can be pivoted into floor pan 22 unimpeded by seat back 152 of front seat 15. This position is stored in memory and, depending on the adjustment of front seat 15, either seat part 151 is moved forward on rails 19 or seat back 152 is raised into a more upright angle. In certain cases, both adjustment processes are performed simultaneously. To activate these control functions in control device 18, a floor panel sensor 33 is used, said sensor detecting the lifting or lowering of floor panel 29 from or into the opening in the floor pan and the corresponding signal is transmitted to control device 18. If control device 18 has a so-called memory function, the control signal from floor panel sensor 33 that is output when floor panel 29 is replaced in the floor pan opening can be used to cause a motor to restore front seat 15 to its original position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Vehicle with at least one rear seat located behind a front seat as viewed in the direction of travel, said rear seat comprising a seat part mounted on the vehicle floor and a seat back mounted pivotably thereto, with a floor pan located in the vehicle floor in front of the rear seat to receive the rear seat when folded together by folding the seat back onto the seat part, with the edge of the floor pan being flush with the floor and with a folding mechanism to pivot the folded rear seat into the floor pan, wherein said folding mechanism has two front and two rear supports, each support being designed to pivot around a respective pivot axis defined by the seat part, the pivot axis being aligned in a lengthwise direction of the vehicle, said supports securing the rear seat in its operating position at a preset seat height above the vehicle floor, wherein the two front supports are mounted so that their ends remote from the seat part can pivot around a pivot axis aligned transversely to the lengthwise direction of the vehicle and defined below the vehicle floor, and wherein the two rear supports are each secured in a bearing accommodated in the vehicle floor, the bearings for the two rear supports being designed as support bearings in which ends of the supports are releasably received.

2. Vehicle according to claim 1, wherein the pivot axis for the ends of the two front supports remote from the seat part is located at the level of the floor pan below the floor level.

3. Vehicle according to claim 1, wherein the floor pan opening is covered by a floor panel that fits flush in the vehicle floor.

4. Vehicle according to claim 2, wherein the floor pan opening is covered by a floor panel that fits flush in the vehicle floor.

5. Vehicle according to claim 3, wherein the floor panel is secured to the vehicle floor so that it can pivot about a floor panel pivot axis that extends along its transverse edge remote from the rear seat.

6. Vehicle according to claim 5, wherein the floor panel is divided parallel to the floor panel pivot axis into two panel parts which can be unfolded onto one another along a pivot axis that is parallel to the floor panel pivot axis.

7. Vehicle according to one of claim 1, wherein the floor pan is extended up to a point below the at least one front seat and additionally receives a spare wheel.

8. Vehicle according to claim 2, wherein the floor pan is extended up to a point below the at least one front seat and additionally receives a spare wheel.

9. Vehicle according to claim 4, wherein the floor pan is extended up to a point below the at least one front seat and additionally receives a spare wheel.

10. Vehicle according to claim 5, wherein the floor pan is extended up to a point below the at least one front seat and additionally receives a spare wheel.

11. Vehicle according to claim 6, wherein the floor pan is extended up to a point below the at least one front seat and additionally receives a spare wheel.

12. Vehicle according to claim 3, wherein said at least one front seat comprises a device for at least one of displacing said at least one front seat lengthwise by at least one motor and adjusting a pitch of a seat back of said at least one front seat by at least one motor; and a control device provided for controlling, said at least one motor, wherein a control function is integrated into the control device, said function causing a displacement movement of the front seat in a way that one of increases the distance from the rear seat and causes an erecting movement of a seat back of the front seat into a specified position when the floor pan opening is exposed by removing the floor panel, allowing the rear seat to pivot into the floor pan, unimpeded by the seat back of the front seat.

13. Vehicle according to claim 5, wherein said at least one front seat comprises a device for at least one of displacing said at least one front seat lengthwise by at least one motor and adjusting a pitch of a seat back of said at least one front seat by at least one motor; and a control device provided for controlling said at least one motor, wherein a control function is integrated into the control device, said function causing a displacement movement of the front seat in a way that one of increases the distance from the rear seat and causes an erecting movement of a seat back of the front seat into a specified position when the floor pan opening is exposed by removing the floor panel, allowing the rear seat to pivot into the floor pan, unimpeded by the seat back of the front seat.

14. Vehicle according to claim 6, wherein said at least one front seat comprises a device for at least one of displacing said at least one front seat lengthwise by at least one motor and adjusting a pitch of a seat back of said at least one front seat by at least one motor; and a control device provided for controlling said at least one motor, wherein a control function is integrated into the control device, said function causing a displacement movement of the front seat in a way that one of increases the distance from the rear seat and causes an erecting movement of a seat back of the front seat into a specified position when the floor pan opening is exposed by removing the floor panel, allowing the rear seat to pivot into the floor pan, unimpeded by the seat back of the front seat.

15. Vehicle according to claim 7, wherein said at least one front seat comprises a device for at least one of displacing said at least one front seat lengthwise by at least one motor and adjusting a pitch of a seat back of said at least one front seat by at least one motor; and a control device provided for controlling said at least one motor, wherein a control function is integrated into the control device, said function causing a displacement movement of the front seat in a way that one of increases the distance from the rear seat and causes an erecting movement of a seat back of the front seat into a specified position when the floor pan opening is exposed by removing the floor panel, allowing the rear seat to pivot into the floor pan, unimpeded by the seat back of the front seat.

16. Vehicle according to claim 1, wherein the vehicle is a minivan.

17. A seating arrangement for a vehicle comprising:

a vehicle floor, a front seat, a rear seat disposed behind the front seat and having a seat part mounted on the vehicle floor and a seat back pivotally connected to the seat part, a floor pan in the vehicle floor in front of the rear seat, and a folding mechanism accommodating movement of the rear seat between an in use position above the vehicle floor and a stowage position in the floor pan below the vehicle floor, said folding mechanism including:

at least one front support pivotally connected at a front support lower pivot axis located below the floor and a front support upper axis on the seat part, and at least one rear support pivotally releasably connected at a rear support hearing point on the vehicle floor and a rear support upper pivot axis on the seat part, wherein said at least one rear support is connected by a releasable support bearing at the rear support lower pivot axis.

18. A seating arrangement according to claim 17, wherein said front support lower pivot axis is disposed adjacent a bottom rear end of the floor pan.

19. A seating arrangement according to claim 17, wherein two of said front supports and two of said rear supports are provided at respective opposite lateral sides of said rear seat.

20. A seating arrangement according to claim 19, wherein said front support lower pivot axis is disposed adjacent a bottom rear end of the floor pan.

21. A seating arrangement according to claim 17, wherein said floor pan has an upwardly facing floor pan opening through which said rear seat moves during movement between the in use and stowage positions, comprising a movable floor panel which covers the floor pan opening flush with surrounding parts of the floor when said rear seat is in its in use or stowage positions.

22. A seating arrangement according to claim 21, wherein floor panel is secured to the vehicle floor so that it can pivot along a floor panel pivot axis that runs along its transverse edge remote from the rear seat.

23. A seating arrangement according to claim 22, wherein the floor panel is divided parallel to the floor panel pivot axis into two panel parts which can be unfolded onto one another along a pivot axis that is parallel to the floor panel pivot axis.

24. A seating arrangement according to claim 23, wherein the floor pan is extended up to a point below the at least one front seat and additionally receives a spare wheel.

25. A seating arrangement according to claim 17, comprising a control system operable to control movement of at least one of longitudinal and tilting movement of one of the front seat and a front seat back, said control system being operable in response to movement of the rear seat between its in use and stowage positions to move the one of the front seat and front seat back away from a position blocking movement of the rear seat into and out of the floor pan.

26. A seating arrangement according to claim 25, wherein said-control system includes a sensor detecting movement of said floor panel.

* * * * *